(12) United States Patent
Tokiwa et al.

(10) Patent No.: US 8,221,876 B2
(45) Date of Patent: Jul. 17, 2012

(54) SKIN-COVERED PROPYLENE RESIN FOAMED MOLDED ARTICLE

(75) Inventors: Tomoo Tokiwa, Kanuma (JP); Shohei Tsuchida, Utsunomiya (JP); Masato Naito, Kanuma (JP)

(73) Assignee: JSP Corporation, Tokyo (JP)

( * ) Notice: Subject to any disclaimer, the term of this patent is extended or adjusted under 35 U.S.C. 154(b) by 354 days.

(21) Appl. No.: 12/149,230

(22) Filed: Apr. 29, 2008

(65) Prior Publication Data

US 2008/0275148 A1 Nov. 6, 2008

(30) Foreign Application Priority Data

May 2, 2007 (JP) .................................. 2007-121721

(51) Int. Cl.
*B32B 3/26* (2006.01)
*B29D 23/00* (2006.01)
*B29D 22/00* (2006.01)
*C08J 9/34* (2006.01)

(52) U.S. Cl. .................. 428/318.6; 428/36.5; 428/35.7; 428/34.1; 521/51; 525/240

(58) Field of Classification Search ................. 428/36.5, 428/35.7, 34.1, 318.6; 521/51; 525/240
See application file for complete search history.

(56) References Cited

U.S. PATENT DOCUMENTS

| | | | |
|---|---|---|---|
| 5,348,795 A * | 9/1994 | Park ............................. | 428/220 |
| 6,096,417 A | 8/2000 | Shioya et al. | |
| 6,306,970 B1 * | 10/2001 | Dang et al. .................... | 525/197 |
| 7,423,071 B2 | 9/2008 | Mogami et al. | |
| 2002/0151611 A1 * | 10/2002 | Thoen et al. .................. | 521/142 |
| 2004/0053066 A1 * | 3/2004 | Cretekos et al. .............. | 428/515 |
| 2004/0132935 A1 * | 7/2004 | Arjunan et al. ............... | 526/160 |
| 2005/0159496 A1 * | 7/2005 | Bambara et al. ................ | 521/50 |

FOREIGN PATENT DOCUMENTS

| | | |
|---|---|---|
| DE | 10226202 | 2/2003 |
| EP | 0 583 542 A1 | 2/1994 |
| EP | 0 916 465 A1 | 5/1999 |
| EP | 1 403 027 A2 | 3/2004 |
| EP | 1 449 634 A1 | 8/2004 |
| EP | 1 486 531 A1 | 12/2004 |
| JP | B2-2860007 | 12/1998 |
| JP | 2003-213054 A | 7/2003 |
| JP | 2004-249558 A | 9/2004 |
| JP | 2004284149 * | 10/2004 |

OTHER PUBLICATIONS

Sep. 9, 2010 European Search Report issued in Application No. 08 00 8223.

* cited by examiner

*Primary Examiner* — Vasu Jagannathan
*Assistant Examiner* — Irina Krylova
(74) *Attorney, Agent, or Firm* — Oliff & Berridge, PLC

(57) ABSTRACT

The present invention pertains to a skin-covered foamed molded article of expanded propylene resin beads having excellent lightness in weight, mechanical properties and appearance.

The present invention provides a skin-covered foamed molded article of propylene resin expanded beads, with the skin covering substantially the entire surface of the molded article of the expanded beads. The skin, within which the molded article of expanded propylene resin beads is placed, is a propylene resin hollow molded body obtained by blow molding. A base resin of which the skin is formed comprises a propylene resin having a partial heat of fusion in a temperature range between 80 and 140° C. of at least 15 J/g and a ratio of the partial heat of fusion to a total heat of fusion (partial heat of fusion/total heat of fusion) of at least 0.2 as measured by heat flux differential scanning calorimetry. The skin has a thickness in the range of 0.3 to 3.5 mm, and the molded article of expanded propylene resin beads has an apparent density in the range of 0.015 to 0.15 g/cm³. The skin is fuse-bonded to the molded article of expanded beads, and the expanded beads from which the molded article is formed are fuse-bonded to each other.

8 Claims, 4 Drawing Sheets

SKIN-COVERED PROPYLENE RESIN FOAMED MOLDED ARTICLE

BACKGROUND OF THE INVENTION

1. Field of the Invention

The present invention relates to a skin-covered foamed molded article of propylene resin expanded beads in which substantially the entire surface of the molded article of the expanded beads is covered with the skin. More specifically, the present invention is directed to a skin-covered propylene resin foamed molded article, wherein the molded article of expanded propylene resin beads is placed within the skin which is in the form of a hollow propylene resin molded body obtained by blow molding.

2. Description of the Related Art

A skin-covered foamed molded article is hitherto known, which is obtained by foaming expanded beads, filled in a hollow skin material, for integration with the skin material. One known method for producing such a skin-covered foamed molded article includes the steps of suspending a resin parison between mold halves of a blow mold, closing the mold halves, blow molding the parison into a hollow molded body, filling expanded beads in the hollow molded body, blowing a heating medium such as steam into the hollow molded body to heat and fuse-bond the expanded beads to each other, and cooling the resulting molded assembly to obtain the skin-covered molded article of the expanded beads in which substantially the entire surface of the molded article of the expanded beads is covered with the skin. Such a method is disclosed in, for example, Japanese Patent No. 2,860,007.

Japanese Patent No. 2,860,007 discloses a method for producing a skin-covered foamed molded article by blow molding, in which method expanded beads of a thermoplastic resin are filled in a hollow molded body, produced by blow molding, before the hollow molded body cools and solidifies, and thereafter feeding steam for heating the expanded beads.

In the conventional method for producing a skin-covered molded article of expanded beads having a skin formed by blow molding, it is necessary that the method can produce a skin-covered molded article of expanded beads having excellent bonding strength between the skin in the form of a hollow molded body and the molded article of expanded beads and between the adjacent expanded beads in order for the skin-covered molded article of the expanded beads to exhibit excellent mechanical properties such as bending strength. In order to produce such a skin-covered molded article of expanded beads, it has been considered to be necessary to fill the expanded beads of a thermoplastic resin within the hollow molded body before the hollow molded body cools and solidifies, as in the method described in Japanese Patent No. 2,860,007, and to control the thickness of the skin to more than 3.5 mm so as to prolong the time required for the skin to cool and solidify.

Whilst a skin-covered molded article of expanded beads having high bonding strength between the skin and the molded article and, therefore, excellent mechanical properties can be obtained when the skin has a large thickness, the weight of such a skin-covered molded article of expanded beads becomes so large that there is caused a problem that lightness in weight, which is one of the important features of foamed molded articles, is adversely affected. There also arises a problem that the molding cycle time becomes long due to the large thickness of the skin. In Japanese Patent No. 2,860,007, the thermoplastic resin expanded beads must be filled in the hollow molded body before the hollow molded body cools and solidifies in order to bond the expanded beads to their adjacent skin surface. Namely, after the hollow molded body has cooled and solidified, it is difficult to bond the skin to the expanded beads during the succeeding step of fuse-bonding the expanded beads to each other by feeding steam for heating.

It is, therefore, an object of the present invention to solve problems in conventional skin-covered molded articles of expanded propylene resin beads with respect to their lightness in weight and molding cycle time which have hitherto remained unsolved in a fully satisfactory manner, and to provide a skin-covered molded article of expanded propylene resin beads having excellent fusion bonding both between the skin and the molded article of expanded beads and between the expanded beads.

With a view toward solving the above problems, the present inventors have conducted a versatile study on base resins for forming skins and on expanded beads from various points of view. As a result it has been found that the desired object can be fulfilled by using a skin formed with a base resin having specific thermal properties. The present invention has been made based on this finding.

SUMMARY OF THE INVENTION

That is, the gist of the present invention is as follows:

(1) A skin-covered propylene resin foamed molded article comprising a skin of a propylene resin hollow molded body obtained by blow molding, and a molded article of expanded propylene resin beads placed within the skin, wherein a base resin of which the skin is formed comprises a propylene resin having a partial heat of fusion in a temperature range between 80 and 140° C. of at least 15 J/g and a ratio of the partial heat of fusion to a total heat of fusion (i.e.; partial heat of fusion/total heat of fusion) of at least 0.2 as measured by heat flux differential scanning calorimetry, wherein the skin has a thickness in the range of 0.3 to 3.5 mm, wherein the molded article of expanded propylene resin beads has an apparent density in the range of 0.015 to 0.15 g/cm$^3$, wherein the skin is fuse-bonded to the molded article of expanded propylene resin beads, and wherein the expanded beads from which the molded article is formed are fuse-bonded to each other.

(2) The skin-covered propylene resin foamed molded article as recited in (1) above, wherein the base resin of which the skin is formed comprises a propylene resin having a melt tension in the range of 1 to 30 cN at 230° C.

(3) The skin-covered propylene resin foamed molded article as recited in (1) or (2) above, wherein the base resin of which the skin is formed comprises a propylene resin obtained by polymerization using a metallocene polymerization catalyst.

(4) The skin-covered propylene resin foamed molded article as recited in (1) above, wherein the base resin of which the skin is formed comprises a mixed resin composed of a propylene resin obtained by polymerization using a metallocene polymerization catalyst and another propylene resin having a melt tension in the range of 1 to 30 cN at 230° C.

The skin-covered propylene resin foamed molded article of expanded propylene resin beads according to the present invention has good bonding between the skin and the molded article of expanded beads in spite of the fact that the skin has a small thickness, and is excellent in lightness in weight, mechanical properties, appearance and reproducibility of the shape of the mold. Further, the present invention gives an effect that the production efficiency is high because the molding cycle time for obtaining the skin-covered propylene resin foamed molded article can be reduced.

In addition, the skin-covered propylene resin foamed molded article in which the skin is formed of a base resin having a specific melt tension has particularly excellent uniformity in skin thickness.

DESCRIPTION OF THE PREFERRED EMBODIMENT

Figure 1:
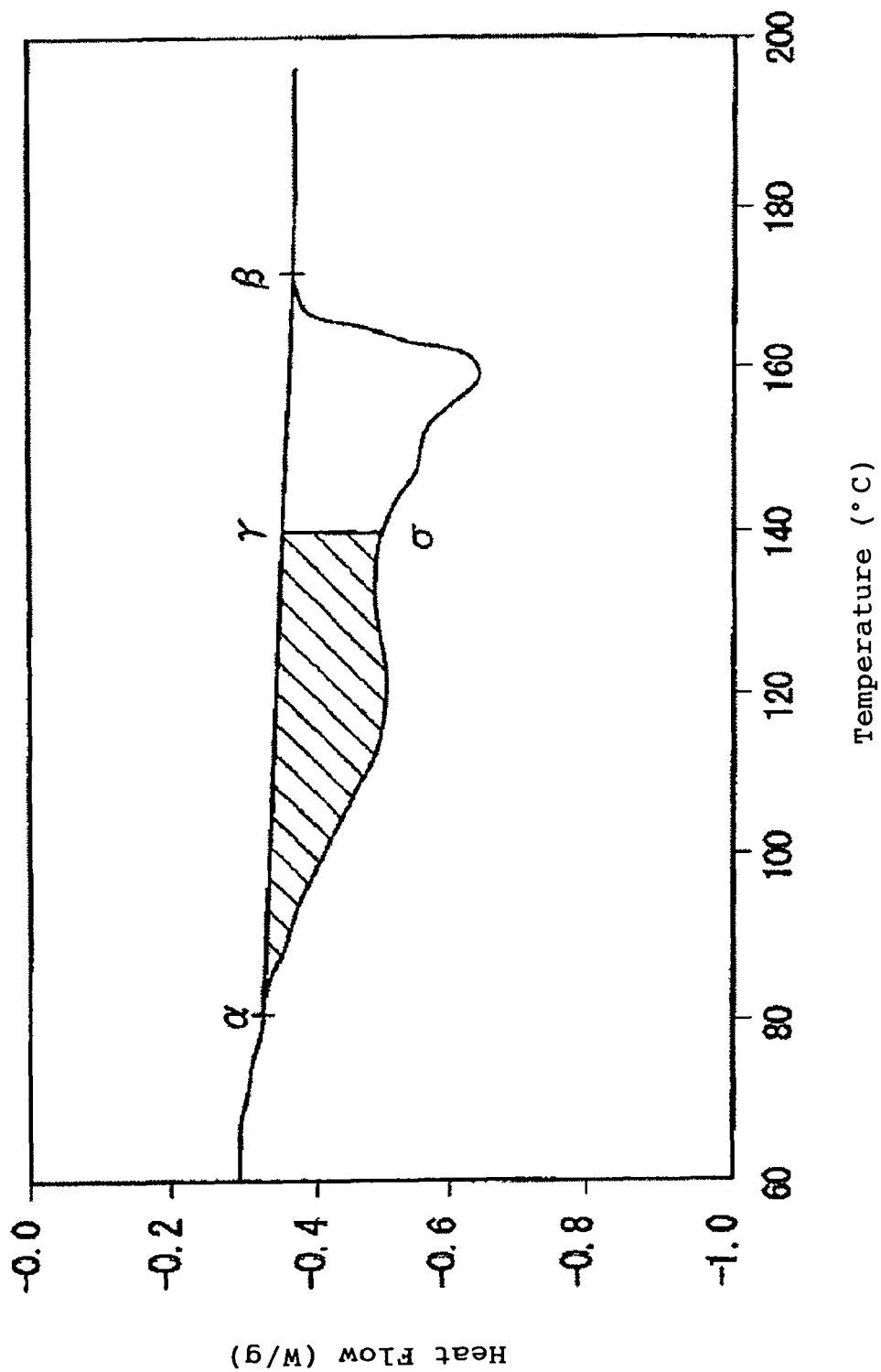
FIG. 1 shows a DSC curve, obtained by heat flux differential scanning calorimetry, for explaining the terms "partial heat of fusion ($\Delta T$)" and "total heat of fusion ($\Delta H$)" as used for the purpose of the present invention.

A skin-covered propylene resin foamed molded article of the present invention (hereinafter occasionally referred to simply as "skin-covered foamed molded article") may be produced as follows. A molten resin charged in an accumulator attached to an extruder is extruded from the die to form a propylene resin parison suspending between mold halves of a blow mold. The mold halves are closed and a gas is blown into the parison to blow mold the parison into a hollow molded body. Expanded propylene resin beads are then filled in the hollow molded body. Thereafter, a heating medium such as steam is blown into the hollow molded body filled with the expanded beads to heat and fuse-bond the expanded beads to each other to form a molded article of expanded beads. At the same time, the expanded beads are fuse-bonded to the hollow molded body as a skin. The resulting molded assembly is then cooled to obtain the skin-covered foamed molded article. The formation of the hollow molded body blow molding is preferably continuously followed by the filling and molding of the polypropylene resin expanded beads in the hollow molded body. If desired, however, the filling and molding of the propylene resin expanded beads in the hollow molded body may be conducted as a separate, independent step after the step of blow molding the hollow molded body.

In the present invention, as a base resin of which the skin is formed, there is used a propylene resin having such thermal characteristics, as measured by heat flux differential scanning calorimetry, that a partial heat of fusion ($\Delta T$) in a temperature range between 80 and 140° C. is at least 15 J/g, preferably 30 to 70 J/g, and a ratio of the partial heat of fusion ($\Delta T$) to a total heat of fusion ($\Delta H$) (i.e.; $\Delta T/\Delta H$) is at least 0.2, preferably 0.4 to 1.0, particularly preferably 0.4 to 0.7.

When the base resin of which the skin is formed comprises the propylene resin meeting the above requirements with respect to thermal characteristics, excellent fusion bonding can be obtained between the hollow molded body serving as the skin and the expanded beads by heating, with steam, the expanded beads filled in the hollow molded body to fuse-bond the expanded beads to each other. On the other hand, in the production of a skin-covered foamed molded article having a thin skin, the importance of the uniformity of the thickness of the hollow molded body serving as the skin is greater than that in the ordinary hollow molded body. In the production of a hollow molded body of a propylene resin having excellent uniformity in thickness, the melt tension (MT) of the propylene resin of which the hollow molded body is formed has been found to play a role.

Thus, it is preferred that the propylene resin used as the base resin of the skin not only have the above-described thermal characteristics but also a melt tension (MT) of 1 to 30 cN. The propylene resin having such a melt tension shows a reduced drawdown and enables the production of a hollow molded body having a uniform thin thickness of preferably 0.3 to 3.5 mm, more preferably 0.5 to 2.5 mm, particularly preferably 0.7 to 2.0 mm. Too low a melt tension (MT) of the propylene resin causes an excessive increase of the drawdown so that the thickness of the obtained hollow molded body tends to considerably vary, though the degree of variation depends upon the volume of the hollow molded body. For the reasons as set forth above, the melt tension (MT) is more preferably at least 2 cN, particularly preferably at least 3 cN. When the melt tension (MT) is excessively large, on the other hand, the die swell is so large that it tends to be difficult to obtain a hollow molded body having a thin thickness. Whilst a thin thickness might be attained by using a high pre-blow air pressure, a great care must be taken in the adjustment of the pre-blow air pressure with a due consideration of the uniformity of the thickness thereof. For these reasons, the melt tension (MT) is more preferably 25 cN or less, particularly preferably 10 cN or less.

Because, in the skin-covered foamed molded article of the present invention, the thickness of the skin thereof is thin. the shape of the molded article can easily follow a complicated shape of the mold. For example, an edge portion of a rectangular corner of the foamed molded article can be precisely formed. Thus, there can be obtained a merit that the foamed molded article has excellent reproducibility of the shape of the mold and provides an extended freedom for designing the foamed molded article.

Incidentally, the terms "partial heat of fusion", "total heat of fusion" and "melt tension" of a base resin of a skin as used herein are as measured by the methods described hereinafter using a skin sample cut out from a skin-covered foamed molded article.

In the production of a skin-covered foamed molded article having a thin thickness skin, a hollow molded body is formed with a hole through which expanded beads are press-filled in the hollow molded body using a feeder. Thereafter, the expanded beads are heated and fuse-bonded to each other with steam to form a molded article of the expanded beads. In this case, when a variation of the thickness of the skin is large, it is difficult to form a hole in the hollow molded body and there is a possibility that the expanded beads cannot be properly filled in the hollow molded body due to non-uniformity of the shape of the hole formed. Further, since there is a possibility that a thin thickness portion of the hollow molded body is damaged and, eventually, broken by the pressure applied thereto during the filling of the expanded beads in the hollow molded body, the expanded beads cannot be press-filled at a preset pressure. Accordingly, the desired molded article of expanded beads may not be obtained.

In the present invention, on the other hand, the base resin of which the skin is formed is a propylene resin showing thermal characteristics including the above-described specific heat of fusion and preferably having a melt tension in the above-described range at 230° C. Thus, when a polypropylene resin raw material is selected such that the base resin of which the skin is formed can meet the above conditions, when expanded beads are filled in a hollow molded body prepared by blow molding a parison made of the propylene resin raw material in a mold, and when the expanded beads filled in the hollow molded body are heated with steam to fuse-bond the expanded beads to each other, the base resin of which the interior surface of the hollow molded body is formed can fuse within a short period of time required until the desired steam heating pressure for producing the foamed molded article of the expanded beads has been reached. Therefore, it is possible to obtain a light weight skin-covered foamed molded article which shows excellent bonding between the skin and the expanded beads and between the expanded beads, in which the molded article of the expanded beads has an apparent density of 0.015 to 0.15 g/cm³ and which is small in variation of the thickness of the skin.

In the present invention, the partial heat of fusion ($\Delta T$) and total heat of fusion ($\Delta H$) of a base. resin of which the skin is formed are determined by the method shown below through measurement by heat flux differential scanning calorimetry (DSC).

The method will be concretely explained below with reference to FIG. 1 which is a DSC curve showing an endothermic peak as measured by heat flux differential scanning calorimetric analysis of the base resin which constitutes the skin used in Example 2 of the present invention.

In the heat flux differential scanning calorimetric analysis, 3 to 5 mg of a resin sample is heated from room temperature to 200° C. and, immediately thereafter, cooled to 40° C. at a rate of 10° C./min. Then a DSC curve is obtained by again heating the sample to 200° C. at a rate of 10° C./min, from which the partial heat of fusion ($\Delta T$) is determined as follows.

1. A straight line ($\alpha$-$\beta$) connecting between a point $\alpha$ on the DSC curve corresponding to 80° C. and a point $\beta$ corresponding to the melt completion temperature (Te) is drawn.

2. Next, a straight line which is parallel with the ordinate of the graph is drawn from a point $\sigma$ on the DSC curve corresponding to 140° C. The intersection point between this straight line and the straight line ($\alpha$-$\beta$) is denoted by $\gamma$.

3. The partial heat of fusion ($\Delta T$) is defined as the calorific value corresponding to the area (shaded portion in FIG. 1) surrounded by the DSC curve, the line segment ($\sigma$-$\gamma$) and the line segment ($\gamma$-$\alpha$).

4. The total heat of fusion ($\Delta H$) is defined as the calorific value corresponding to the area surrounded by the DSC curve and the line segment ($\alpha$-$\beta$).

In the heat flux differential scanning calorimetric analysis, 80° C. is suited as the starting point of the base line for determining, with good reproducibility, the heat of fusion of a base resin. Therefore, the present invention adopts 80° C. as the starting point of the base line. The partial heat of fusion in a temperature range between 80° C. and 140° C. is a heat of fusion between the starting point of the base line (namely 80° C.) and the approximate temperature of pressurized steam (namely 140° C.) that is actually used at the time the expanded beads are heated and molded. The present inventors have found that the partial heat of fusion in a temperature range of between 80° C. and 140° C. represents an important parameter and that the intended object of the present invention can be achieved when the partial heat of fusion falls within the above-described specific range.

It is also preferred that the propylene resin of which the skin of the present invention is formed have a melt flow rate (measured at a temperature of 230° C. and a load of 21.18 N) of 0.1 to 5 g/10 minutes.

5. The propylene resin with the above thermal characteristics which constitutes the skin of the present invention is a propylene homopolymer, a copolymer of propylene with ethylene or an $\alpha$-olefin having 4 to 8 carbon atoms, or a mixture of two or more propylene homopolymers and copolymers. As the copolymer of propylene with ethylene or an $\alpha$-olefin having 4 to 8 carbon atoms, there may be mentioned, for example, a propylene-ethylene random copolymer, a propylene-ethylene block copolymer, a propylene-butene random copolymer, a propylene-butene block copolymer, a propylene-ethylene-butene random copolymer and a propylene-ethylene-butene block copolymer. Among the above propylene resins, a propylene resin obtainable by polymerization using a metallocene catalyst or a mixture of such propylene resins, especially a propylene random copolymer obtainable by polymerization using a metallocene catalyst or a mixture of such propylene copolymers, are preferably used.

A transition metal compound containing a metal belonging to Groups 4 to 6 of the Periodic Table and having a conjugated five-membered ring ligand, namely a metallocene compound, has a high olefin polymerization activity and, therefore, is used as an olefin polymerization catalyst. As compared with an ordinary propylene resin obtained by using a conventional Ziegler Natta polymerization catalyst, a propylene copolymer obtained by using a metallocene polymerization catalyst is able to have a narrower molecular weight distribution, a lower melting point and a higher degree of crystallization and contains in the molecule a larger amount of a moiety contributing to melting at a low temperature. Thus, even when a propylene resin obtained by using a metallocene polymerization catalyst has the same melting point as that obtained by using a conventional Ziegler Natta polymerization catalyst, the former propylene resin has better fusion bonding property than the latter.

It is further preferred that the base resin of which the skin is formed be such that the DSC curve thereof obtained by the heat flux differential scanning calorimetric analysis for determining the partial heat of fusion thereof has an endothermic peak whose peak temperature is present in a temperature range of 115 to 140° C., particularly 120 to 135° C. In this case, it is also preferred that the base resin have a melt tension of 1 to 30 cN, more preferably 3 to 25 cN. Incidentally, the melting point of the base resin of which the skin is formed is the same as that of the propylene resin pellet used as the raw material thereof. However, the melt tension of the base resin of which the skin is formed is the same as or occasionally smaller than that of the propylene resin pellet used as the raw material thereof. For this reason, if necessary, a preliminary experiment is to be carried out with a consideration of thermal hysteresis of the base resin during the formation of a hollow molded body so as to determine a suitable base resin for forming a skin having the desired melt tension.

With regard to the conditions under which the expanded beads are heated with steam for producing a molded article of the expanded beads, it is preferable to complete the steam heating within a short period of time by increasing the pressure to the desired molding pressure within a relatively short period of time in order to obtain a suitable molded article of the expanded beads which has good fusion bonding between the expanded beads and which is low in shrinkage. From the standpoint of fusion bonding between the skin and the molded article of the expanded beads, on the other hand, it is preferable to perform the steam heating for a long period of time so that the fusion bonding can be fully established between the inside surface of the skin and the expanded beads.

For the reasons that both good moldability of a hollow molded body serving as a skin and good fusion bonding between the skin and a molded article of the expanded beads can be obtained, it is preferable to use a propylene random copolymer which is obtained by using a metallocene polymerization catalyst, which has a narrow molecular weight distribution and which permits a part of the base resin of the hollow molded body to swiftly melt (in an amount sufficient to establish fusion bonding with the expanded beads) until the desired molding pressure has been reached at the time of the steam heating for the formation of the molded article of the expanded beads.

In the present invention, it is desirable to take uniformity of the thickness of the skin into consideration. From this point of view, it is preferred that a propylene resin obtained by using a metallocene polymerization catalyst be used in admixture with other propylene resin(s) having a high melt tension, rather than used by itself. In such a case, the blending proportion is preferably such that the propylene resin having a high melt tension is not more than 80% by weight, more preferably 20 to 80% by weight.

When the base resin of which the skin is formed comprises a mixed resin composed of a low melting point propylene resin and a high melting point propylene resin and when the low melting point propylene resin is a propylene resin obtained by polymerization using a metallocene polymerization catalyst, the melting point attributed to the low melting point propylene resin of the mixed resin is shifted, for example by about 5° C., to a low temperature side as compared with the melting point. of the low melting point propylene resin before mixing. Also, the melting point attributed to the high melting point propylene resin of the mixed resin is shifted slightly to a low temperature side as compared with the melting point of the high melting point propylene resin before mixing. As a consequence, a skin obtainable from such a mixed resin shows further improved bonding to the molded article of the expanded propylene resin beads provided inside the skin.

As the base resin of which the expanded beads used for the purpose of the present invention are formed, there may be mentioned a propylene resin such as a conventionally generally used propylene homopolymer and a copolymer of propylene with ethylene or an a-olefin having 4 to 8 carbon atoms.

Preferably used for the purpose of the present invention are those expanded beads which, in a DSC curve obtained in the first heating of 3 to 5 mg of sample expanded beads at a rate of 10° C./min to 200° C. in the heat flux differential scanning calorimetry, shows at least one endothermic peak having a peak temperature in a temperature region not higher than the melting point of the base resin and at least one endothermic peak (hereinafter also occasionally referred to as "high temperature peak") having a peak temperature in a temperature region higher than the melting point of the base resin, with the high temperature peak having a calorific value of 2 to 12 J/g.

The expanded beads may also be those which have a multi-layer structure, so called core/sheath structure, composed of an expanded propylene resin core layer and a coating layer covering the core layer and made of a resin having a melting point or a softening point lower than that of the resin forming the core layer; those which are made of a propylene resin obtained by polymerization using a metallocene polymerization catalyst; or those which are made of a mixture of a propylene resin with a petroleum resin. The use of these expanded beads allows for the use of relatively low pressure steam heating for fuse-bonding the expanded beads to each other.

The expanded beads filled in the hollow molded body in the present invention have an apparent density of 0.02 to 0.2 g/cm$^3$ and may be produced by the known method customarily employed for preparing such expanded beads. For example, the expanded beads may be produced by a method which includes the steps of dispersing resin particles in a predetermined amount of water, which may optionally contain a surfactant as desired, contained in a vessel capable of being pressurized, such as an autoclave, feeding a blowing agent to the autoclave under pressure with stirring and with heating so that the resin particles are impregnated with the blowing agent, and, after maintaining the dispersion for a given period of time, discharging the resin particles together with the water from the autoclave maintained at a high temperature and a high pressure to a lower pressure environment to foam and expand the resin particles.

An outline of a method for producing the skin-covered foamed molded article of the present invention will be described below with reference to FIG. 2 and FIG. 3.

Figure 2:
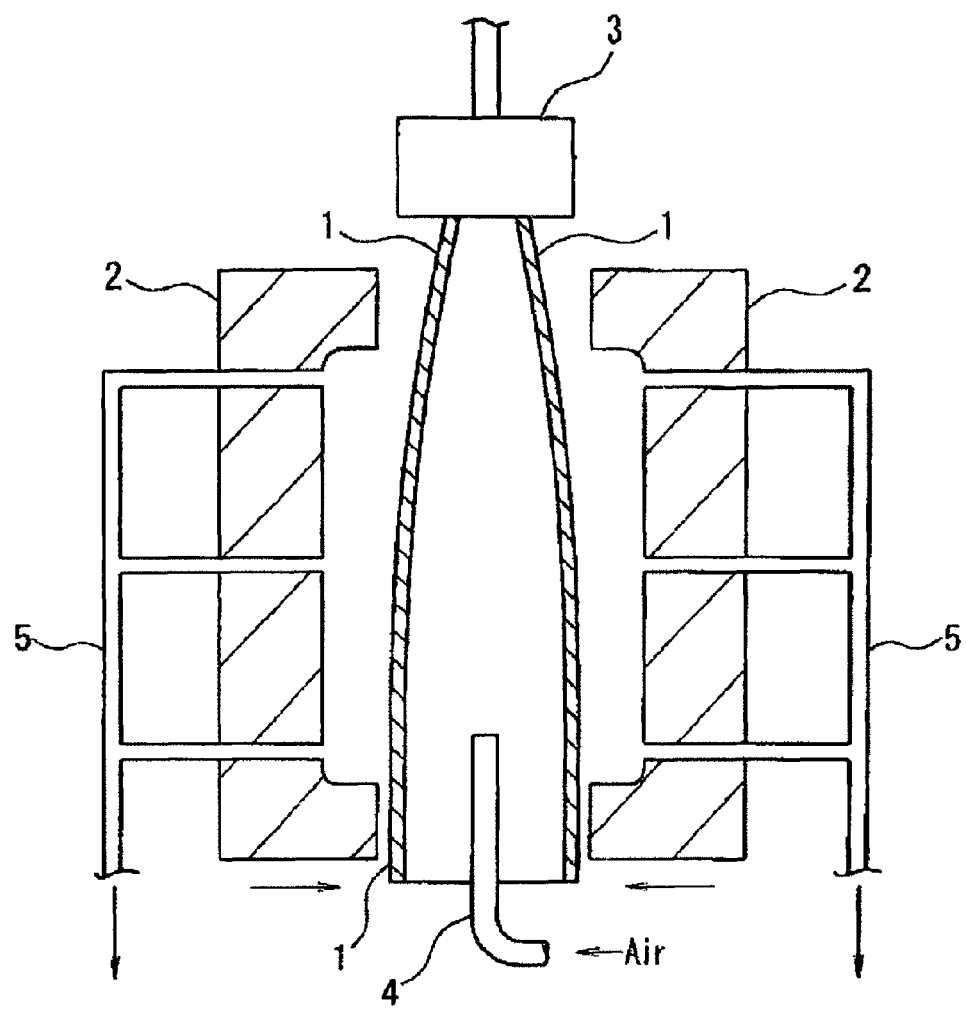
FIG. 2 shows a cross-sectional view diagrammatically illustrating an embodiment of a parison preparation step.

FIG. 2 shows an example of a method of preparing a parison. A molten resin accumulated in an accumulator attached to an extruder (not shown) is extruded in a tubular form through a die 3 to form a parison 1 suspended between a pair of left and right moveable blow molds 2 and 2. The molds are then moved in the directions shown by the arrow and closed. Air is introduced into the parison through an air feeding pipe 4 and is evacuated from suction pipes 5 and 5 to blow-mold the parison into a hollow molded body conforming to the shape of the molds.

Figure 3:
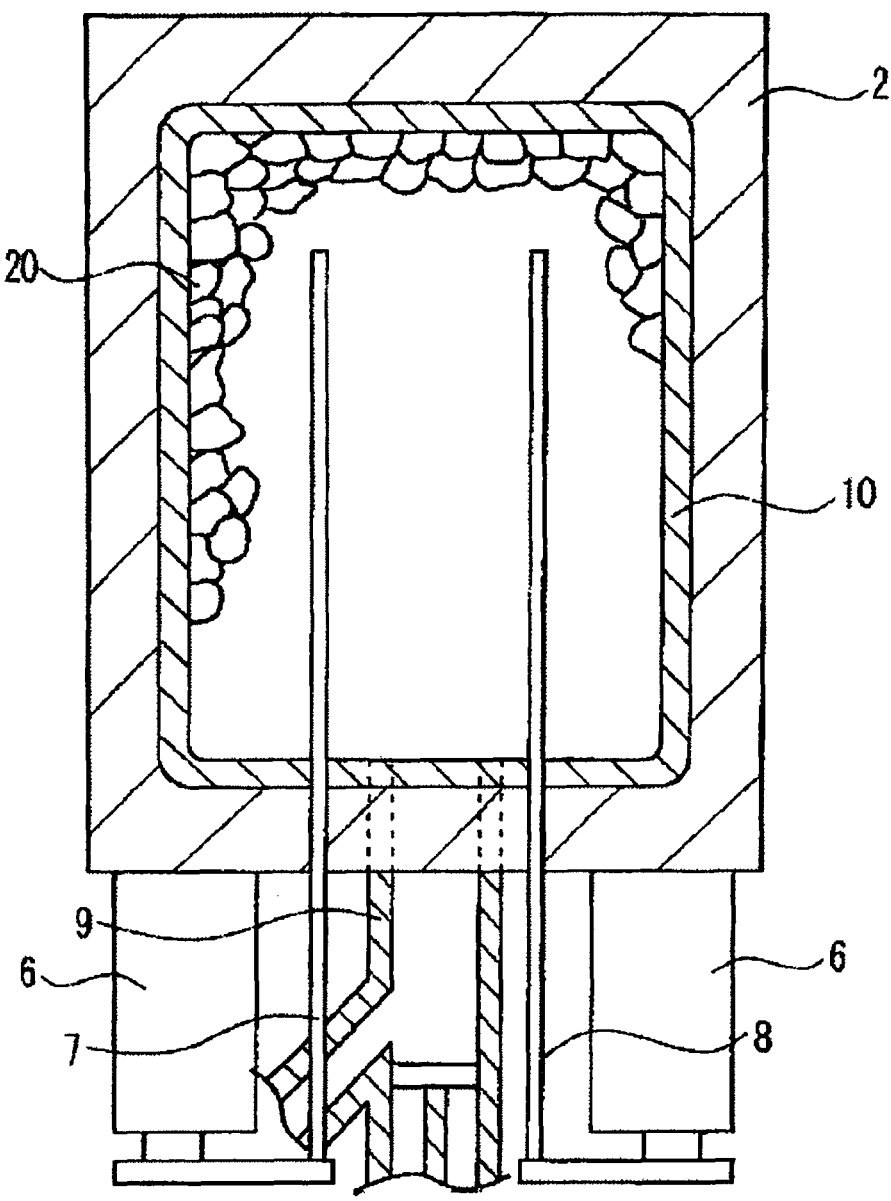
FIG. 3 shows a cross-sectional view diagrammatically illustrating an example of an apparatus for producing a skin-covered foamed molded article.
Figure 4:
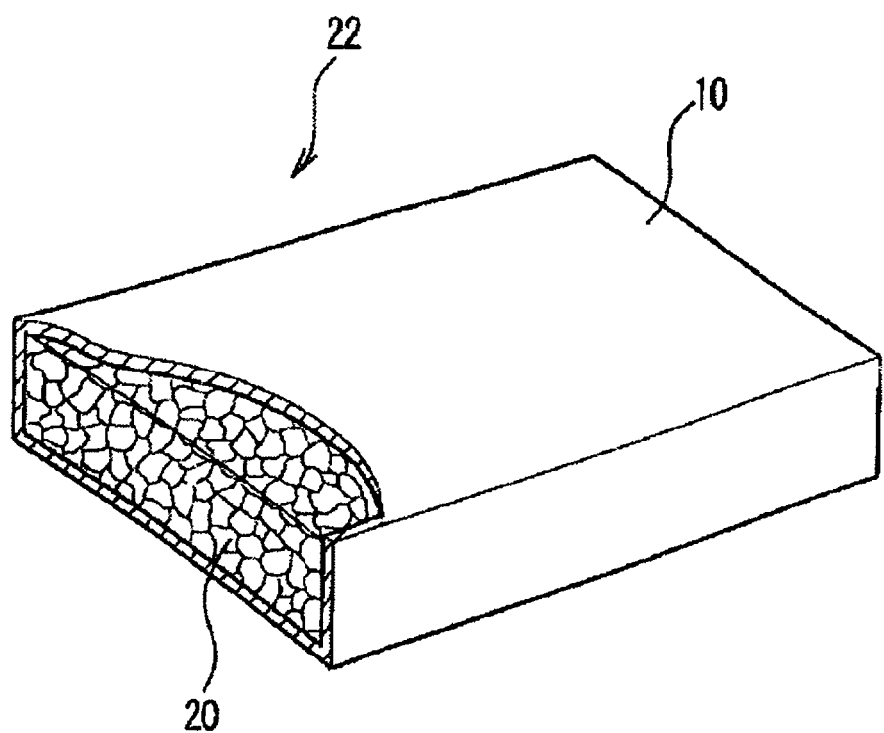
FIG. 4 shows a perspective view, partly exploded, illustrating an embodiment of a skin-covered foamed molded article of the present invention.

Thereafter, as shown in FIG. 3, pipes 7 and 8 for feeding or discharging steam are inserted into the hollow molded body 10, which will finally form the skin of the skin-covered foamed molded article, to control the pressure inside the hollow molded body. Expanded propylene resin beads are press-filled in the hollow molded body through a filling feeder 9 while adjusting the pressure inside the hollow molded body. The pipes 7 and 8 and the filling feeder 9 are configured to be driven by cylinders 6 and 6. The expanded beads filled in the hollow molded body are heated by feeding pressurized steam from one of the pipes 7 and 8 while evacuating the fed steam through the other pipe. The above operation is repeated by alternately switching the steam flow direction for a predetermined period of time to completely fuse-bond the expanded beads to the skin as well as the expanded beads to each other, thereby obtaining a molded article 20 of the expanded beads where no void spaces are present between the expanded beads. The molds are then cooled and the cylinders are driven to retract the pipes and feeder from the molded article. The molds are thereafter opened to obtain a skin-covered foamed molded article 22. As a result of the above operations, there is obtained the skin-covered foamed molded article of the present invention in which the entire surface of the molded article of the expanded beads except the traces of the insertion holes of the pipes 7 and 8 and the filling feeder 9 is covered with the skin. It is preferred that at least 80%, more preferably at least 90%, particularly preferably at least 95% of the total surface area of the foamed molded article of the skin-covered foamed molded article of the present invention be covered with the skin. A perspective view, partly exploded, of the thus obtained skin-covered foamed molded article is illustrated in FIG. 4.

The pressure used for press-filling the expanded beads through the filling feeder into the hollow molded body is 0.2 to 4.0 kgf/cm$^2$(G).

The steam heating pressure used for heating and fuse-bonding the expanded beads to form a molded article of the expanded beads and for fuse-bonding the skin and the expanded beads to each other is generally 3.0 to 3.6 kgf/cm$^2$ (G), though the pressure varies with the kind of the expanded beads. When the steam heating pressure is excessively low, the fusion bonding efficiency of the expanded beads is reduced. Such a reduction is not preferable because a long heating time is required to increase the fusion bonding between the expanded beads and, therefore, because a long molding cycle time is required. Too high a steam heating pressure, on the other hand, causes an increase of the energy cost and is disadvantageous from the standpoint of economy. Further, when the steam heating pressure is excessively high, a phenomenon of shrinkage of the molded article of the expanded beads occurs after the molding so that a skin-covered foamed molded article having good dimensional accuracy is not obtainable.

The molded article of the expanded beads in the skin-covered foamed molded article of the present invention has an apparent density of 0.015 to 0.15 g/cm$^3$, preferably 0.02 to 0.1 g/cm$^3$, more preferably 0.025 to 0.08 g/cm$^3$, particularly preferably 0.03 to 0.06 g/cm$^3$.

The apparent density of the skin-covered foamed molded article as a whole is preferably 0.03 to 0.3 g/cm$^3$, more preferably 0.03 to 0.2 g/cm$^3$, though the density value varies more or less depending upon the thickness of the skin.

EXAMPLES

Next, examples are shown below for further describing the present invention in detail. The evaluation results shown in the examples of the present invention are intended to relatively illustrate the effect of the present invention in comparison with comparative examples and, therefore, the present invention is not limited to the examples in any way.

Example 1

Polypropylene (Trade Name: WINTEC, Grade Name: WFX6, melt flow rate: 2 g/10 minutes, melt tension: 1.2 cN, melting point: 125° C.) obtained by polymerization using a metallocene polymerization catalyst manufactured by Japan Polypropylene Corporation was fed to an extruder having an inside diameter of 65 mm and heated and molten at 180° C. to obtain a molten resin for forming a skin. The polypropylene obtained by polymerization using the metallocene polymerization catalyst will be hereinafter referred to simply as "metallocene type polypropylene".

The molten resin was accumulated in an accumulator controlled at 180° C. and was extruded through a die, connected downstream of the accumulator, at the discharge rate (kg/h·cm$^2$) indicated in Table 1 to form a parison in a tubular form. The term "discharge rate" as used herein is a value obtained by dividing the instant discharge amount (kg/h) by the maximum open area of the die lip (cm$^2$).

The obtained parison in a softened state was then placed between water-cooled mold halves (dimension of the mold cavity defined by the plate-like molds was 400 mm in length, 250 mm in width and 40 mm in thickness) located immediately beneath the die. After the closure of the mold halves, a pressurized gas (air) was blown inside the parison through a gas blowing port mounted at a lower portion of the mold while simultaneously evacuating the space between the exterior surface of the parison and the interior surface of the mold, so that a hollow molded body (skin) having the thickness indicated in Table 1 was obtained.

Next, expanded beads of a propylene-ethylene random copolymer having the apparent density indicated in Table 2 (melt flow rate: 8 g/10 minutes, melting point: 145° C., ethylene content: 2.5% by weight) were filled in the obtained hollow molded body. When filling the expanded beads in the hollow molded body, two pipes spaced apart a given distance for feeding or discharging steam were longitudinally inserted into the hollow molded body. Thus, while controlling the pressure inside the hollow molded body at the press-filling pressure indicated in Table 2 using the pipes, the expanded beads were filled therein through a filling feeder. Thereafter, steam of 3.2 kgf/cm$^2$(G) was fed for 8 seconds from one of the two pipes inserted into the filled expanded beads while evacuating the fed steam from the other pipe. Then, the flow of heating steam was switched by feeding steam of 3.2 kgf/cm$^2$ (G) from said other pipe, which had been just used for the evacuation, for 8 seconds while evacuating steam from said one pipe which had been just used for feeding steam. Finally, steam of 3.2 kgf/cm$^2$(G) was simultaneously fed from both of the two pipes for 5 seconds to heat and mold the expanded beads, thereby obtaining a molded article of the expanded beads in which the expanded beads are fuse-bonded to each other in the hollow molded body and which is free of space between the expanded beads.

The molded article of expanded beads was then cooled by evacuation from the pipes inserted thereinto. The mold was opened to take out the skin-covered foamed molded article. The skin-covered foamed molded article was aged at 60° C. for 24 hours under the atmospheric pressure. In the obtained skin-covered foamed molded article, more than 95% of the surface area of the foamed molded article was found to be covered with the skin. It was also found that the interior surface of the skin was completely fuse-bonded to the molded article of the expanded beads. The physical properties of the obtained skin-covered foamed molded article were as shown in Table 2.

Example 2, 3 and 4

Metallocene type polypropylene (Trade Name: WINTEC, Grade Name: WFX6) manufactured by Japan Polypropylene Corporation and polypropylene (Grade Name: Pro-fax 7823, melt flow rate: 0.4 g/10 minutes, melt tension: 5.5 cN, melting point: 163° C.) manufactured by Basell Inc. were dry blended with the mixing proportion shown in Table 1. The mixed resin was fed to an extruder having an inside diameter of 65 mm and heated and molten at 180° C. to obtain a molten resin for a skin. Except that the thus obtained molten resin was used, a skin-covered foamed molded article was prepared in the same manner as that described in Example 1. The physical properties of the obtained skin-covered foamed molded article were as shown in Table 2.

Example 5

A skin-covered foamed molded article was prepared in the same manner as that described in Example 1 except that the thickness of the skin was adjusted to the value indicated in Table 1. The physical properties of the obtained skin-covered foamed molded article were as shown in Table 2.

Comparative Example 1

Polypropylene (Grade Name: Pro-fax 7823) manufactured by Basell Inc. was fed to an extruder having an inside diameter of 65 mm and heated and molten at 220° C. to obtain a molten resin for a skin. The molten resin was accumulated in an accumulator controlled at 220° C. and extruded from the accumulator through a die, connected downstream of the accumulator, at the discharge rate (kg/h·cm$^2$) indicated in Table 1 to form a parison. The parison was then processed in the same manner as that described in Example 1 to obtain a skin-covered foamed molded article. The physical properties of the obtained skin-covered foamed molded article were as shown in Table 2.

Comparative Example 2

A skin-covered foamed molded article was prepared in the same manner as that described in Comparative Example 1 except that the thickness of the skin was adjusted to the value indicated in Table 1. The physical properties of the obtained skin-covered foamed molded article were as shown in Table 2.

The evaluation of the physical properties of the above skin-covered foamed molded articles was carried out as follows.

Uniformity of thickness of the skin:

The uniformity of the thickness of the skin was evaluated by measuring the thickness of the skin on one of the opposing sides (with a dimension of 400 mm in length and 250 mm in width) of the rectangular parallelepiped skin-covered foamed molded article (length: 400 mm, width: 250 mm, thickness 40 mm). More particularly, the skin-covered foamed molded article was longitudinally cut into equal halves. On the exposed cross-section, the thickness of the skin of the above-described one of the two opposing sides (with a dimension of 400 mm in length and 250 mm in width before cutting) was measured at three different positions; namely the thickness $(T_A)$ at the center thereof, and the thicknesses $(T_B)$ and $(T_C)$ at positions spaced a distance of 5 cm from both ends thereof, respectively. The arithmetic mean $(T_E)$ of the $(T_A)$, $(T_B)$ and $(T_C)$ was then calculated. When all of the three differences $(T_E)-(T_A)$, $(T_E)-(T_B)$ and $(T_E)-(T_C)$ were less than 0.1 mm in absolute value, the uniformity of the thickness of the skin was evaluated as rank A. When all of the three differences $(T_E)-(T_A)$, $(T_E)-(T_B)$ and $(T_E)-(T_C)$ were less than 0.2 mm in absolute value but at least one of them was 0.1 mm or greater in absolute value, the uniformity was evaluated as rank B. When at least one of the three differences was 0.2 mm or greater in absolute value, the uniformity was evaluated as rank C.

Melt Tension (MT):

The melt tension is measured using Capirograph 1D (manufactured by Toyo Seiki Selsaku-Sho, Ltd.). More concretely, a cylinder having a cylinder diameter of 9.55 mm and a length of 350 mm and an orifice having a nozzle diameter of 2.095 mm and a length of 8.0 mm are used. The cylinder and the orifice are set at a temperature of 230° C. A propylene resin sample is charged in a required amount into the cylinder and held therein for 4 minutes. The molten resin is then extruded in the form of a string through the orifice at a piston speed of 10 mm/minute. The extruded resin string is put on a tension-detecting pulley having a diameter of 45 mm and is taken up on a take-up roller while increasing the take-up speed at a constant take-up acceleration rate such that the take-up speed increases from 0 m/minute to 200 m/minute through a period of 4 minutes. At this time, the maximum tension immediately before the string breaks is measured. The reason for adopting a time period of 4 minutes to increase the take-up speed from 0 m/minute to 200 m/minute is to suppress thermal deterioration of the resin and to improve the reproducibility of the measured values. The above measurement is carried out for ten different samples of the same resin. From the obtained ten measured maximum values, the largest three values and the smallest three values are excepted. The arithmetic mean of the rest four maximum values is the melt tension (cN) as used for the purpose of the present invention.

When the resin string does not break up to the take-up speed of 200 m/minute in the above method for the measurement of the melt tension, then the melt tension (cN) is measured by the take-up operation at a constant take-up speed of 200 m/minute. More concretely, in the same manner as that described above, the molten resin is extruded in the form of a string, and the extruded resin string is put on a tension-detecting pulley and taken up on a take-up roller while increasing the take-up speed at a constant take-up acceleration rate such that the take-up speed increases from 0 m/minute to 200 m/minute through a period of 4 minutes. When the take-up speed of 200 m/minute is reached, recording of the melt tension data is started and continued for 30 seconds. From the obtained tension load curve for a measuring period of 30 seconds, the maximum tension (Tmax) and minimum tension (Tmin) are determined The arithmetic mean (Tave) of the maximum tension (Tmax) and minimum tension (Tmin) is the melt tension as used for the purpose of the present invention. The term maximum tension (Tmax) as used herein is intended to refer to a value obtained by dividing a sum of the tension values of the peaks detected in the tension load curve by the number of the peaks, while the term minimum tension (Tmin) as used herein is intended to refer to a value obtained by dividing a sum of the tension values of the dips detected in the tension load curve by the number of the dips.

It is without saying that the above measurement should be carried out such that inclusion of air bubbles in the string is prevented as much as possible at the time of extrusion of the molten resin in the string form through the orifice.

Thickness of the Skin:

The thickness of the skin-covered foamed molded article was measured as follows. A skin-covered foamed molded article sample was cut by a plane normal to the longitudinal direction thereof at three positions, namely at near the center in the longitudinal direction thereof and at two positions near the longitudinal both ends thereof (while avoiding a position where the skin-covered foamed molded article has a special shape). In the cross-section in each of the three cut positions, the thickness of the skin was measured at six positions which are nearly equally spaced apart along the circumference direction of the skin. The arithmetic mean of the thus obtained eighteen (18) thickness values is the thickness of the skin.

Bonding between the skin and the molded article of expanded beads:

From a skin-covered foamed molded article, a rectangular parallelepiped test piece (having a length of 10 cm, a width of 10 cm and a thickness equal to the thickness of the skin-covered foamed molded article) having a 10 cm×10 cm square skin on each of the both sides was cut out. One of the skins of the test piece was peeled off from the molded article of the expanded beads with a peeling force of about 200 N (about 20 kgf). The peeled state of the molded article of the expanded beads from the skin was evaluated by observing the peeled surface of the molded article of the expanded beads according to the following ranks of A, B and C:

A: At least 50% (as the basis for expanded beads number)of the expanded beads showed material fracture.

B: At least 30% but less than 50% of the expanded beads showed material fracture.

C: No expanded beads show material fracture and the molded article of the expanded beads were separated from the skin along the inside surface of the skin.

Peel Strength:

From a skin-covered foamed molded article, a rectangular parallelepiped test piece of the molded article of expanded beads (having a length of 50 mm, a width of 50 mm and a thickness of 40 mm) covered on both sides with 50 mm×50 mm square skins was cut out. The both sides (skin surfaces) of the test piece were bonded with an adhesive to jigs for measuring a peel strength. The test piece was then subjected to a tensile test at a tension rate of 2 mm/minute using a tensile testing machine. The maximum point stress determined by the tensile testing machined is shown in Table 2 in terms of the peel strength. A test piece having very strong bonding between the skin and the molded article of the expanded beads caused material fracture between the expanded beads. By the above measurement, the skin-covered foamed molded articles of the present invention were found to have a peel strength (maximum point stress) of at least 0.5 kgf/cm² and to be excellent in bonding between the skin and the molded article of the expanded beads.

Melting Point by DSC Measurement:

The melting point was measured with a heat flux differential scanning calorimeter. More concretely, 3 to 5 mg of a sample resin was heated from room temperature to 200° C. Immediately thereafter, the sample was cooled to 40° C. at a rate of 10° C./minute. Then, the sample was heated again to 200° C. at a rate of 10° C./minute for the DSC measurement. In the obtained DSC curve, the peak temperature of the endothermic peak was defined as the melting point. In Table 1, there are cases where there are two melting points. Existence of two melting points indicates that there are two endothermic peaks. The peak temperatures of the two peaks are shown as the two melting points.

Density:

The apparent density of expanded beads, the apparent density of a molded article of expanded beads, and the apparent density of a whole skin-covered foamed molded article were determined as follows.

Apparent density of expanded beads: A group of expanded beads (weight: W (g)) were immersed in water contained in a graduation cylinder using a wire net or the like. From the rise of the water level in the graduation cylinder, a volume (V (cm³)) of the group of the expanded beads was measured. The apparent density of the expanded beads was determined by dividing the weight of the group of the expanded beads by the volume thereof (i.e.; W/V).

Apparent density of molded article of expanded beads: A sample was cut out from a molded article of expanded beads which is a skin-covered foamed molded article from which the skin was excluded. The apparent density of the molded article of expanded beads was determined by dividing the weight of the sample by the volume thereof.

Apparent density of whole skin-covered foamed molded article: The apparent density of a skin-covered foamed molded article as a whole was determined by dividing the weight of the skin-covered foamed molded article by the volume of thereof.

Lightness in Weight:

When the apparent density of a whole skin-covered foamed molded article was less than 0.2 g/cm³, the lightness in weight was rated as rank A. When the apparent density was 0.2 g/cm³ or greater, the lightness in weight was rated as rank B.

Molding Cycle Time:

A skin-covered foamed molded article produced at a molding cycle time of less than 150 seconds was rated rank A, a molding cycle time of not less than 150 seconds but less than 180 seconds was rated rank B, and a molding cycle time of 180 seconds or longer was rated rank C.

TABLE 1

| Number | Constitution of Raw Material | Mixing Proportion (% by weight) | Melting Point (° C.) | Partial Heat of Fusion ΔT (J/g) | Total Heat of Fusion ΔH (J/g) | ΔT/ΔH |
|---|---|---|---|---|---|---|
| Example 1 | m-PP | 100 | 125 | 50.1 | 54.3 | 0.92 |
| Example 2 | m-PP/HMS-PP | 70/30 | 120/159 | 34.1 | 62.8 | 0.54 |
| Example 3 | m-PP/HMS-PP | 50/50 | 120/161 | 26.1 | 69.8 | 0.37 |
| Example 4 | m-PP/HMS-PP | 30/70 | 120/162 | 18.3 | 72.1 | 0.25 |
| Example 5 | m-PP | 100 | 125 | 50.1 | 54.3 | 0.92 |
| Comparative Example 1 | HMS-PP | 100 | 163 | 12.0 | 78.0 | 0.15 |
| Comparative Example 2 | HMS-PP | 100 | 163 | 12.0 | 78.0 | 0.15 |

| Number | MT (cN) | Skin Thickness (mm) | Uniformity of Skin Thickness | Discharge Rate (kg/h·cm²) | Maximum Open Area of Die Lip (cm²) | Instant Discharge Amount (kg/h) |
|---|---|---|---|---|---|---|
| Example 1 | 1.2 | 1.5 | B | 145 | 4.14 | 600 |
| Example 2 | 2.0 | 1.5 | A | 192 | 3.77 | 725 |
| Example 3 | 2.7 | 1.5 | A | 209 | 3.58 | 750 |
| Example 4 | 3.8 | 1.5 | A | 236 | 3.39 | 800 |
| Example 5 | 1.2 | 1.0 | B | 227 | 2.64 | 600 |
| Comparative Example 1 | 5.0 | 1.5 | A | 251 | 3.39 | 850 |
| Comparative Example 2 | 5.0 | 4.0 | C | 94 | 9.04 | 850 |

In Table 1, m-PP represents polypropylene obtained by polymerization using a metallocene polymerization catalyst, and HMS-PP represents a high melt strength-type polypropylene.

TABLE 2

| Number | Apparent Density of Expanded Beads (g/cm³) | Pressure of Press-Filling (kgf/cm²(G)) | Pressure of Heating Steam (kgf/cm²(G)) | Apparent Density of Molded Article of Propylene Resin Expanded Beads (g/cm³) |
|---|---|---|---|---|
| Example 1 | 0.051 | 1.4 | 3.2 | 0.039 |
| Example 2 | 0.051 | 1.4 | 3.2 | 0.039 |
| Example 3 | 0.051 | 1.4 | 3.2 | 0.039 |
| Example 4 | 0.051 | 1.4 | 3.2 | 0.039 |
| Example 5 | 0.051 | 1.4 | 3.2 | 0.039 |
| Comparative Example 1 | 0.051 | 1.4 | 3.2 | 0.039 |
| Comparative Example 2 | 0.051 | 1.4 | 3.2 | 0.039 |

| Number | Density of Skin-Covered Foamed Molded Article (g/cm³) | Peel Strength (kgf/cm²) | Bonding between Skin and Molded Article of Expanded Beads | Lightness In Weight | Molding Cycle Time |
|---|---|---|---|---|---|
| Example 1 | 0.107 | material fracture | A | A | A |
| Example 2 | 0.107 | material fracture | A | A | A |
| Example 3 | 0.107 | 1.2 | B | A | A |
| Example 4 | 0.107 | 0.8 | B | A | A |
| Example 5 | 0.094 | 0.7 | B | A | A |
| Comparative Example 1 | 0.107 | 0.2 | C | A | B |
| Comparative Example 2 | 0.225 | material fracture | A | B | C |

What is claimed is:

1. A skin-covered propylene resin foamed molded article consisting of a propylene resin skin layer of a propylene resin hollow molded body obtained by blow molding, and
    a molded article of expanded propylene resin beads placed within the skin layer,
    wherein a base resin of which the skin layer is formed comprises:
    a mixed resin composed of propylene resin obtained by polymerization using a metallocene polymerization catalyst and another propylene resin having a melt tension in the range of 2 to 30 cN at 230° C.,
    the base resin having a partial heat of fusion in a temperature range between 80° C. and 140° C. of 15 to 70 J/g, a ratio of the partial heat of fusion to a total heat of fusion of 0.25 to 0.7, and an endothermic peak whose peak temperature being present in a temperature range of 115° C. to 140° C. as measured by heat flux differential scanning calorimetry, and a melt tension in the range of 2 to 30 cN 230° C.,
    the skin layer has a thickness in the range of 0.3 to 2.0 mm,
    the molded article of expanded propylene resin beads has an apparent density in the range of 0.015 to 0.15 g/cm³,
    the skin layer is fuse-bonded to the molded article of expanded propylene resin beads, and wherein the expanded beads from which the molded article is formed are fuse-bonded to each other.

2. The skin-covered propylene resin foamed molded article according to claim 1, wherein the base resin has a melt flow rate of 0.1 to 5 g/10 minutes.

3. The skin-covered propylene resin foamed molded article according to claim 1, wherein the base resin has a ratio of the partial heat of fusion to a total heat of fusion of 0.4 to 0.7.

4. A skin-covered propylene resin foamed molded article consisting of a propylene resin skin layer of a propylene resin hollow molded body obtained by blow molding, and a molded article of expanded propylene resin beads placed within the skin layer,
    wherein a base resin of which the skin layer is formed comprises a propylene resin obtained by polymerization using a metallocene polymerization catalyst, having a partial heat of fusion in a temperature range between 80° C. and 140° C. of 15 to 70 J/g, a ratio of the partial heat of fusion to a total heat of fusion of 0.4 to 0.92, and an endothermic peak whose peak temperature being present in a temperature range of 115° C. to 140° C. as measured by heat flux differential scanning calorimetry, and a melt tension in the range of 1 to 30 cN at 230° C.,
    the skin layer has a thickness in the range of 0.3 to 2.0 mm,
    the molded article of expanded propylene resin beads has an apparent density in the range of 0.015 to 0.15 g/cm³,
    the skin layer is fuse-bonded to the molded article of expanded propylene resin beads, and wherein the expanded beads from which the molded article is formed are fuse-bonded to each other.

5. The skin-covered propylene resin foamed molded article according to claim 2, wherein the base resin of which the skin layer is formed comprises a propylene resin having a melt tension in the range of 2 to 30 cN at 230° C.

6. The skin-covered propylene resin foamed molded article according to claim 4, wherein the base resin of which the skin layer is formed comprises a propylene resin obtained by polymerization using a metallocene polymerization catalyst, having a partial heat of fusion in a temperature range between 80° C. and 140° C. of 30 to 70 J/g.

7. The skin-covered propylene resin foamed molded article according to claim 4, wherein the base resin has a melt flow rate of 0.1 to 5 g/10 minutes.

8. The skin-covered propylene resin foamed molded article according to claim 4, wherein the base resin has a ratio of the partial heat of fusion to a total heat of fusion of 0.4 to 0.7.

* * * * *